May 29, 1962 G. EGGERS ET AL 3,036,430
JET CONTROL APPARATUS
Filed June 16, 1959 6 Sheets-Sheet 1
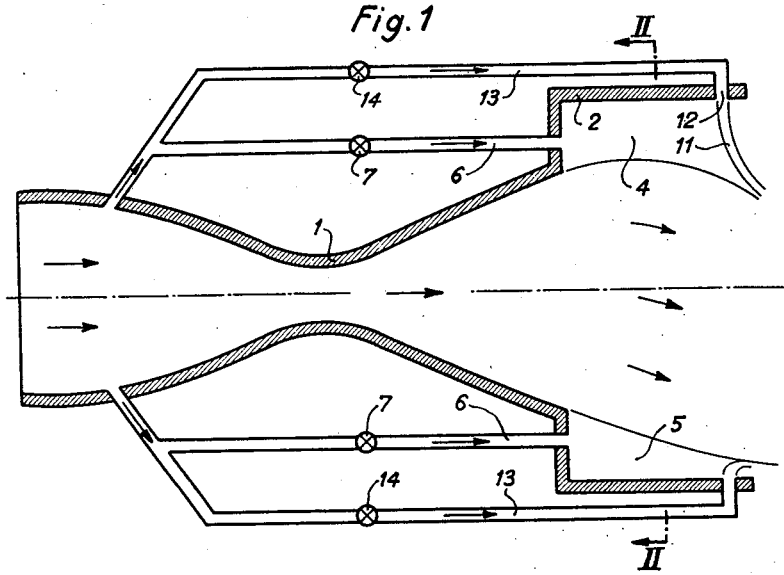
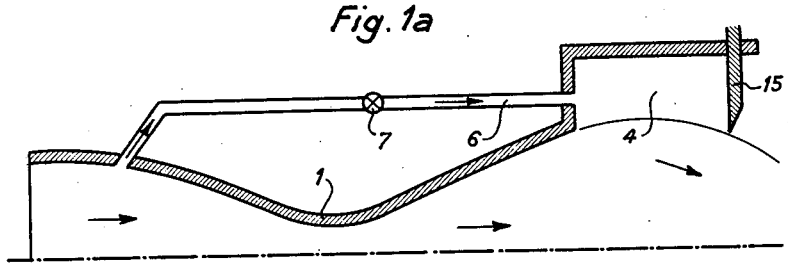
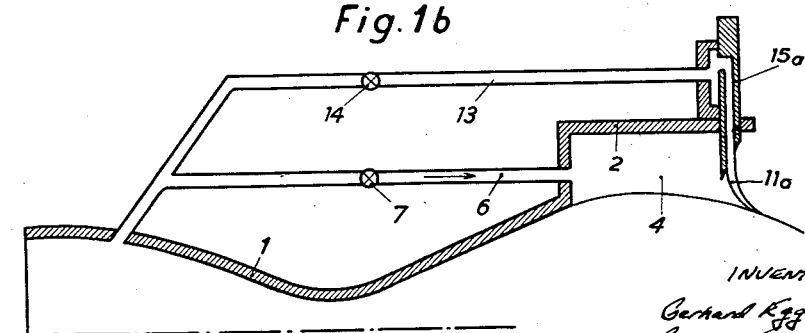
INVENTORS
Gerhard Eggers
Gunther Ernst
Etienne Y.v.M. Gire
Francis V.M.G. Tremouilles
by Watson, Cole, Grindle & Watson

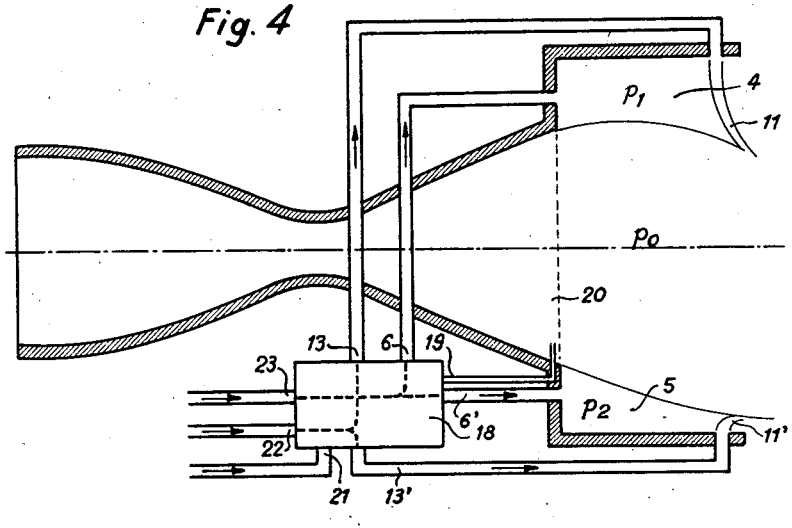
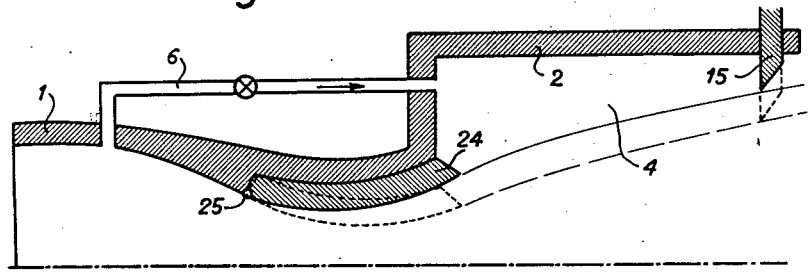
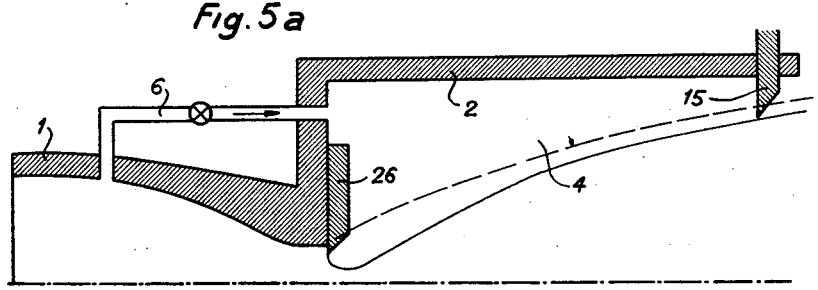

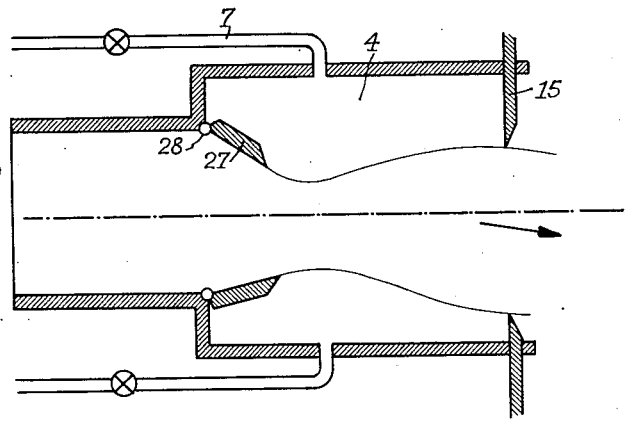
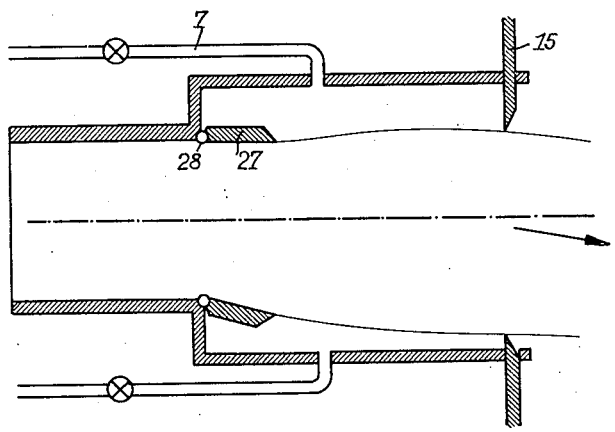
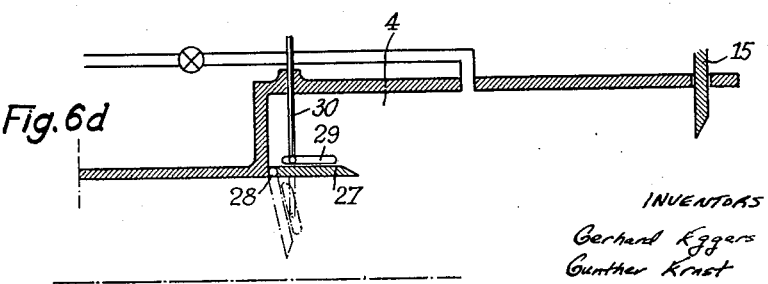

May 29, 1962 G. EGGERS ET AL 3,036,430
JET CONTROL APPARATUS
Filed June 16, 1959 6 Sheets-Sheet 6

INVENTORS
Gerhard Eggers
Gunther Krist
Etienne Y.V.M. Gire
Francis J.M.C. Tremouilles By Watson, Cole, Grindle & Watson United States Patent Office 3,036,430
Patented May 29, 1962

3,036,430
JET CONTROL APPARATUS
Gerhard Eggers and Gunther Ernst, Dammarie-les-Lys, Etienne Yves Jean Marie Gire, Fontaine Le Port, and Francis Jean-Marie Guy Tremouilles, Paris, France, assignors to Societe Nationale d'Etude et de Construction de Moteurs d'Aviation, Paris, France, a French company
Filed June 16, 1959, Ser. No. 820,809
Claims priority, application France June 19, 1958
4 Claims. (Cl. 60—35.54)

This invention relates to the control of the jets provided by propulsive units and other apparatus, more particularly directional control (deviation) and the adaptation of the nozzle by control of the throat in the case of supersonic jets.

Many mechanical and pneumatic devices have been proposed for deviating a jet, such as articulated shutters, solid obstacles of variable height or variable-delivery secondary jets, but in supersonic flow the main disadvantage of such devices is that deviation decreases as speed increases, the excess pressure zone being limited by the position of the shock wave detached from the wall upstream of the obstacle.

This invention, which is of use for supersonic flow, obviates this disadvantage by means of an apparatus wherein the nozzle walls are extended by controllable-pressure isobar fluid walls. The pressures of the fluid walls are the pressures in pressure chambers distributed around the jet periphery, the direction and shape of which can be controlled by suitable control of the pressures in said chambers. More particularly for deviation, the pressures are controlled asymmetrically in two opposite chambers. Advantageously, members are provided for downstream closure of the chambers to reduce the flow tending to escape therefrom (leakage flow), the control of such members being combined with the control of the pressure in the various chambers.

The apparatus according to the invention, where used to control the shape of the flow for its adaptation to the optimum expansion ratio (supersonic nozzle), is associated with members for varying the ratio of the output section to the section at the throat of the nozzle.

The following description, taken together with the accompanying non-limitative exemplary drawings, shows clearly the various features of the invention and how the same may be carried into effect; any feature deriving from the text or drawings forms, of course, part of the invention. In the drawings:

FIG. 1 is a diagrammatic longitudinal sectional view of a supersonic nozzle comprising a jet deviation device according to the invention, the chambers being closed aerodynamically;

FIGS. 1a and 1b are part-sectional views of variants in which the chambers are closed either mechanically (FIG. 1a) or by means of a mixed system;

Figure 6:
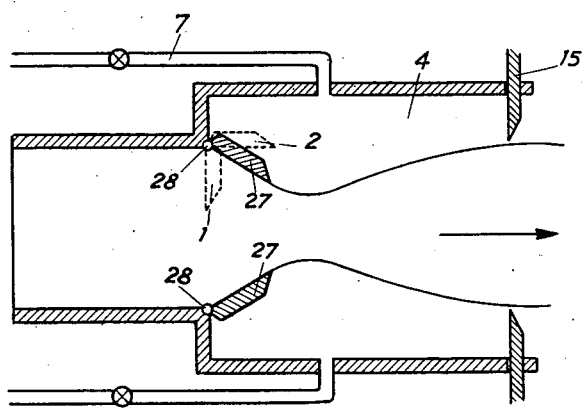
Figure 6A:
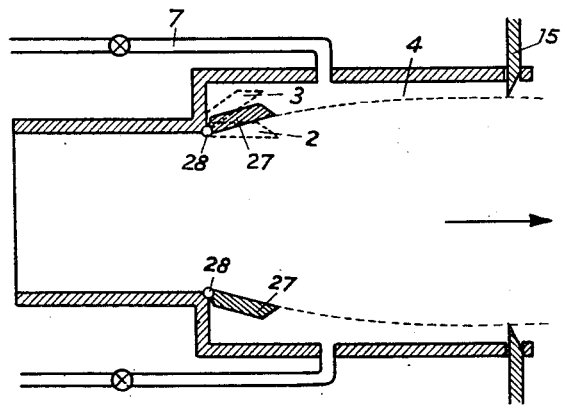
Figures 7A, 7B:
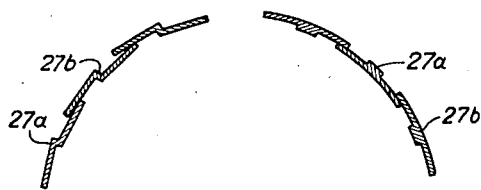
Figure 7C:
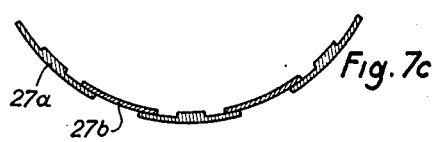
Figure 8:
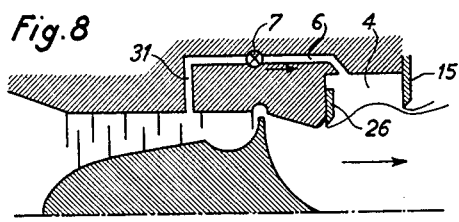
Figure 9:
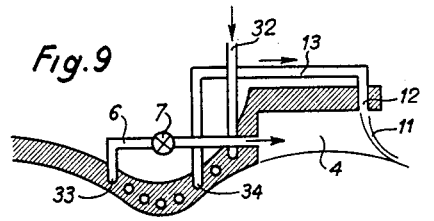
Figure 10:
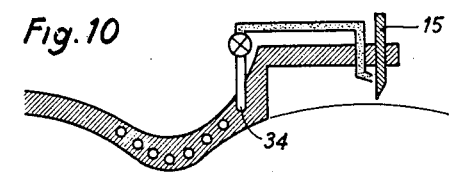

FIG. 4 diagrammatically illustrates a method of regulating the various jet deviation control parameters;

FIGS. 5 and 5a are partial longitudinal sectional views showing a method of adapting the nozzle for supersonic and transonic flow;

FIGS. 6 and 6a are longitudinal sectional views showing the position of the shutters for adaptation of the nozzle on transonic and supersonic flow;

FIGS. 6b and 6c illustrate the combination of jet deviation with adaptation of the nozzle for either transonic or supersonic flow;

FIG. 6d illustrates a device for limiting the chambers and operating the shutters;

FIGS. 7a–7c illustrate, in the case of a circular cross-section vein, a number of shutter profiles enabling the shutters to be moved without upsetting wall continuity, and FIGS. 8–10 diagrammatically illustrate applications of the invention to a turboreactor and to a rocket.

FIG. 1 illustrates a convergent-divergent nozzle 1 which can be, for instance, the exhaust nozzle of a supersonic turboreactor, ram jet, rocket or the like.

Figure 2:
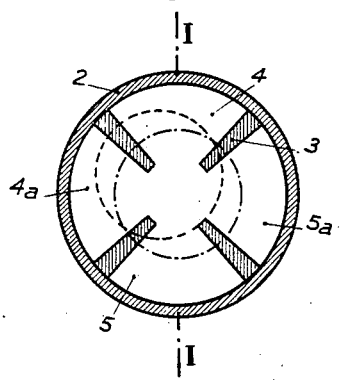
FIGS. 2 and 2a are cross-sectional views, taken along the line II—II of FIG. 1, with stationary and moving chamber partitions.

Downstream of the plane containing the outlet aperture of the nozzle, a wall 2 forms a capacity surrounding the jet. This capacity is divided by radial partitions 3 (FIG. 2) into a number of independent chambers 4, 5, 4a, 5a etc. distributed regularly around the jet. Through a pipe 6 having a control valve 7 fluid is supplied to each such chamber at a suitable pressure and can be, for instance, gases sampled in the propulsive unit upstream of the nozzle or it can be derived from any other source. To prevent excessive leakage of the fluid the downstream side of each chamber 4, 4a, 5a is closed in one of the following ways:

(1) A fluid curtain 11 (FIG. 1) formed by a slit-like part 12 supplied through a pipe 13 having a control valve 14;

(2) A moving mechanical shutter 15 between the end of the walls and the jet (FIG. 1a) and moved by suitable means to reach the jet frontier;

(3) A mixed mechanical and aerodynamic shutter consisting of a moving mechanical shutter 15a within which flows a fluid providing the closure jet 11a (FIG. 1b), the position of the shutter 15a and the rate of flow of the fluid 11a being independently controllable.

With the apparatus thus arranged, it will be apparent that, given equal pressures in the chambers 4, 4a, 5, 5a, the jet will issue axially. On the other hand, if, for instance, the valve 7 associated with the chamber 4 is further opened to increase the pressure therein, whereas the valve 7 associated with the opposite chamber 5 is closed further to reduce the pressure therein, the jet will be deflected towards the chamber 5 as shown in FIG. 1.

Of course, the deviation would be produced in the opposite direction if the pressure in the chamber 5 were greater than in the chamber 4. The chambers 4a, 5a can produce a deviation in a plane perpendicular to the plane of FIG. 1. Finally, if the pressure is increased simultaneously in the two contiguous chambers 4 and 5a, for instance, by a pressure decrease in the other two chambers, the deviation can be produced along a bisecting plane—i.e. in any of the eight directions of deviation. More than four chambers can be provided. With a minimum of four chambers in all directions of deviation can be produced continuously by vectorial combination of the deviation forces provided by each pair of opposed chambers.

The lengthwise separating partitions in the pressure chambers can be stationary or movable.

Figure 3:
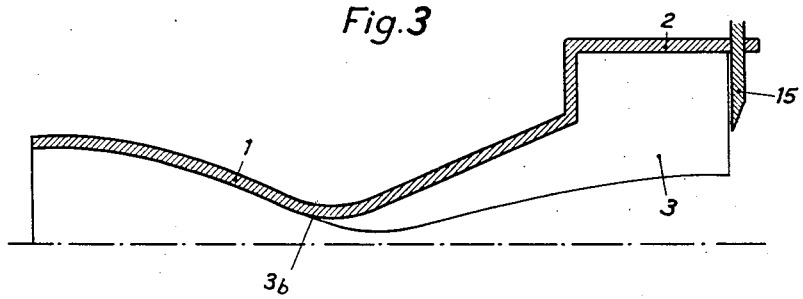
FIGS. 3, 3a and 3b illustrate, respectively, a stationary partition, a translationally movable partition and a rotary partition.

(1) To ensure separation of the chambers in all the positions of the jet, the inner edge of the stationary partitions 3 must always bite into, or at least be flush with, the flow, whatever the deviation. The longitudinal profile of a partition (FIG. 3) will therefore be substantially that of the jet at the maximum deviation on the side opposite the partition. Being parallel with the flow the partitions do not cause much drag. The transition region 3b between the partitions 3 and the wall of the nozzle 1 should be upstream of the throat in the subsonic part of the nozzle.

Figure 2A:
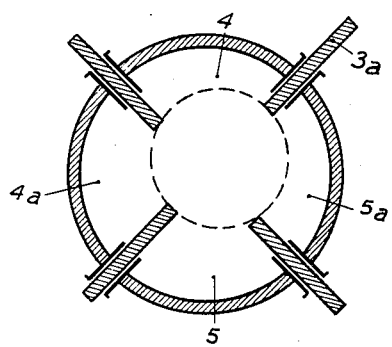
Figure 3A:
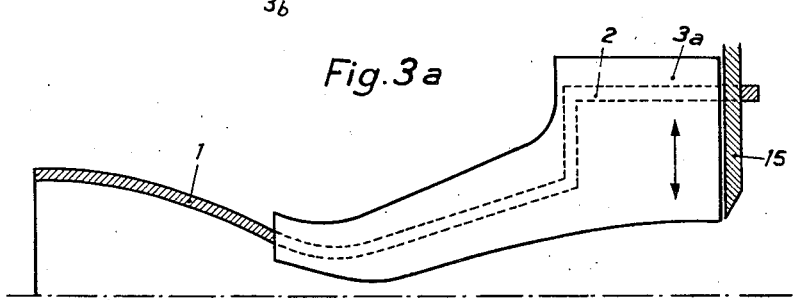
Figure 3B:
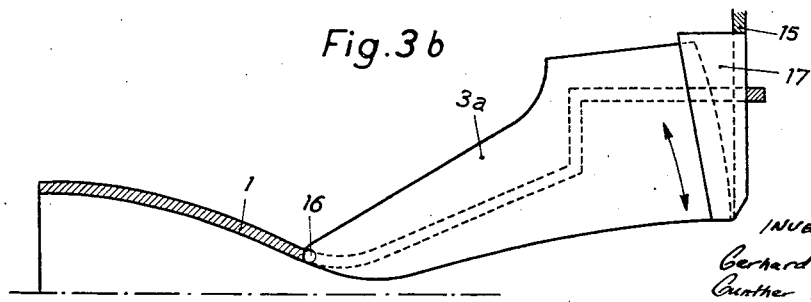

(2) If it is required not to leave an excessive part of the partitions within the jet, for instance, for fear of losing power or of the partitions being damaged by overheating, the moving partitions can be adapted for translational movement or rotation as shown in FIGS. 2a, 3a and 3b. Each partition slides in its plane, the inner edge being adapted to come just flush with the flow. The connection of the vein and of the moving partitions is effected upstream of the throat and without any large projection. FIG. 3a illustrates a translationally movable partition 3a, and FIG. 3b illustrates a partition 3a pivotable around a spindle 16 disposed upstream of the throat of the nozzle 1, the closure member 15 having on one side a wall 17 partially covering the partition 3a.

The pressure applied to the entire surface of the jet near a given chamber is constant and equal to the pressure therein, hence the effect is as if the jet were extended by isobar surfaces surrounding and bounding the jet but flexible and deformable to impose the required deviation on the jet, thus obviating the disadvantage of the known deviators mentioned earlier on.

In the case of a liquid rocket the pressure fluid supplying the chambers could be sampled in the vapour phase of the fuel or of the combustion support flowing to cool the nozzle or supply the combustion chamber, or in the case of liquid or powder rockets, in the vapour phase of a neutral liquid such as the water used to cool the nozzle, or in any other way once the fluid source is at a greater pressure than the pressure within the jet (just at the exit of the divergent part).

The fluid forming the screening curtain (FIGS. 1 and 1b) can be sampled in the combustion chamber or derived from the high-pressure gas or liquid combustion support circuit before such support is introduced into the combustion chamber or any other place.

The required deviation of the jet must be produced by controlling a number of elements. The pressures $p_1$ and $p_2$ in the opposite chambers 4, 5 are, of course, a function of the pressure $p_0$ in the jet to be deflected.

Deviation depends upon the three pressures just mentioned and upon the Mach number M of the flow and upon the dimensions and position of the chambers. However, the latter may be permanently fixed. The movement of the mechanical or aerodynamic members for controlling the leakage flow depends upon the pressures $p_1$, $p_2$ and $p_0$ and upon the deviation produced.

Another factor, if the lateral partitions for separating the chambers are not stationary, is the control of the position of such partitions. This position depends upon the deviation.

Hence the choice of $p_1$ and $p_2$ for a given deviation α of the jet is determined by the value of $p_0$ so that a control box is required.

FIG. 4 diagrammatically illustrates a device for simultaneous control of the pressures in the chambers and of the closure members (where the latter are fluid curtains). In this example a control box 18 receives at 19 a signal denoting the pressure $p_0$ at 20 in the jet, said box receiving the deviation order at 21, the pressure fluid for supplying the closure jets at 22, and the pressure fluid for supplying the pressure chambers at 23. The box 18 supplies through pipes 13, 13' the fluid for the closure jets 11, 11' and through the pipes 6, 6' fluid at pressures $p_1$, $p_2$ for the chambers 4, 5, similar pipes supplying the other two chambers 4a, 5a.

When a control signal corresponding to a specified deviation is received by the box 18 at 21, the box acts simultaneously upon the flow of the closure jets 11, 11', and the pressures $p_1$, $p_2$ in the chambers 4, 5 relatively to the pressure $p_0$ inside the jet.

Constructional details of the control box do not form the subject matter of this invention; the box can be mechanical, electrical, hydraulic etc. or a combination of these different methods.

The engineer will use conventional means to provide this control which, although complicated, does not offer any special difficulties. The control box is given merely as one exemplary method of automatic co-operation of the various controls needed for deviation, but the controls could be co-ordinated manually.

In the case of supersonic flow the filling of the chambers with pressure fluid can be obviated by using the positive pressure occurring downstream of the shock wave produced when one of the closure members is moved so as to bite slightly into the jet.

Another application of the invention now to be described with reference to FIGS. 5 (supersonic nozzle) and 5a (transonic nozzle) concerns control of the jet in accordance with the required expansion ratio (ratio of the flow-generating pressure to atmospheric pressure), deviation of the controlled jet still remaining possible. In theory recourse should be had to a nozzle of which the throat and the solid divergent part would have a variable section and a variable shape respectively, but such a device would be difficult to embody.

If the part near the throat is made of variable section and if the basic pressure in the chambers 4, 4a, 5, 5a is adjusted to a value corresponding to the required section at the throat, the conditions of adaptation of the nozzle can be improved although, of course, it is impossible to achieve the exact shape of the vein corresponding to loss-free expansion which would be given by a carefully designed solid divergent part.

In the embodiment illustrated in FIG. 5 the apparatus comprises a shutter 24 which, as it pivots around a spindle 25, reduces the throat section of the nozzle.

The throat section of the nozzle can be varied in a transonic flow (FIG. 5a) by a solid obstacle 26 which is of variable height and which is gradually introduced into the jet. Co-ordination of control of the pressures in the chambers and of the control of the position of the closure members 15 and of the throat section is effected by means similar to those hereinbefore described with reference to controlling just the deviation of the jet.

FIGS. 6 to 6d show designs, suitable for transonic or supersonic flow, for controlling the section of the jet at the throat (transonic flow) or of the exit section (supersonic flow) in dependence upon the position of the shutters relatively to the nozzle axis, while retaining the fluid wall deviation apparatus hereinbefore described.

FIG. 6 shows how the jet section can be controlled at the throat, the flow being transonic in that section. The shutters 27, as they pivot around spindles 28, move symmetrically towards the nozzle interior (for instance, from position 1 to position 2).

FIG. 6a shows how the jet exit section can be controlled, the flow being supersonic in that section. The shutters 27 move symmetrically towards the outside of the nozzle (from position 2 to position 3).

FIGS. 6b and 6c show how the shutters 27 can pivot asymmetrically for control of the throat section (sonic section, FIG. 6b) or for control of the exit section (supersonic section, FIG. 6c). With this arrangement the jet can be deviated or it can be increased by combination with the fluid wall device.

FIG. 6d illustrates a case in which, for some reason, such as operation of the shutter, it is required to limit the deviation chambers 4, 5 etc. at the nozzle exit.

Sliding partitions 29 moved by rods 30 articulated to the ends of the shutters isolate the pressure chambers from the shutters and can still be used to control the shutters.

The invention does not lay any restrictions on the shape of the vein, the cross-section of which can be square, rectangular, elliptical or the like, although the cross-section of the vein will, of course, be circular as a rule.

Sliding elements such as 15 and 26 (FIG. 5a) can be overlapping, and pivoting elements such as 24 (FIG. 5) and 27 (FIG. 6) can also be assembled on the basis of sliding fits. FIG. 7a is a cross-sectional view showing the assembly of two pivoting elements 27a, 27b which overlap in accordance with a fitting at mid-thickness; in FIG. 7b the elements 27a, 27b fit together on a mortice and tenon basis, while in FIG. 7c the elements 27a, 27b fit together by abutments on one of the members only. Assemblies of this kind are common in nozzles and can be controlled by sliding or pivoting rods or any other known means.

This invention, which makes a jet more readily controllable (deviation, control of a section), can be applied, inter alia:

(1) To turboreactors, by sampling air at 31 from the compressor, for instance, to provide the pressures in the chambers 4 and to cool the moving parts 15, 26 (FIG. 8).

(2) To ram jets, by sampling air upstream of the burners for the same purposes.

(3) To liquid or powder rockets. In the liquid rocket the pressures are produced by sampling in the gaseous state either fuel or combustion support or neutral substances, for instance, cooling water. Before reaching the combustion chamber, some of the fluid is sampled, reaches 32 (FIG. 9) and flows in the upstream direction through a pipe surrounding the throat before being sampled at 33 for injection as a gas, for instance, into the pressure chamber 4. The rate of flow of the fluid can be reduced by constriction provided, for instance, by the liquid phase of one of the aforesaid substances sampled at 34 and supplying the tube 12 through the pipe 13 (FIG. 9). If the constriction is produced by mechanical obstacles 15, the liquid phase sampled at 34 can cool such obstacles by flowing over them (FIG. 10) or in them (FIG. 1b). In powder rockets a neutral substance must be used to perform one or both of these two functions (maintenance of pressures and cooling of moving partitions, if need be).

(4) To supersonic turbines and compressors.

What we claim is:

1. Apparatus for controlling the direction and shape of a supersonic jet issuing from a nozzle, said apparatus comprising a capacity disposed immediately downstream of the nozzle and surrounding the jet, radial longitudinal partitions placed in said capacity and thus bounding chambers open inwardly towards the jet, operating means to cause said radial longitudinal partitions substantially to follow the frontier of the jet, closure means placed at the downstream ends of the chambers and adapted to cooperate with said supersonic jet for generating a fluid pressure in each of said chambers so that the jet is bounded by isobar fluid surfaces extending the nozzle wall, and control means for controlling said closure means in order to vary the pressure in each of said chambers and thereby to vary the direction and shape of the jet.

2. Apparatus according to claim 1 wherein the closure means consist in solid obstacles of variable height.

3. Apparatus according to claim 1 wherein the closure means consist in variable-flow fluid curtains.

4. Apparatus according to claim 1 wherein the closure means consist in mixed mechanical and aerodynamic shutters each including a moving solid obstacle within which flows a variable-flow fluid curtain.

References Cited in the file of this patent

UNITED STATES PATENTS

| | | |
|---|---|---|
| 2,420,323 | Meyer et al. | May 13, 1947 |
| 2,694,898 | Stauff | Nov. 23, 1954 |
| 2,744,381 | Geisel | May 8, 1956 |
| 2,799,990 | Hausmann | July 23, 1957 |
| 2,841,955 | McLafferty | July 8, 1958 |
| 2,846,844 | O'Rourke | Aug. 12, 1958 |
| 2,870,600 | Brown | Jan. 27, 1959 |
| 2,924,934 | Rainbow | Feb. 16, 1960 |
| 2,931,169 | Glenn | Apr. 5, 1960 |

FOREIGN PATENTS

| | | |
|---|---|---|
| 1,155,534 | France | Dec. 2, 1957 |

OTHER REFERENCES

SAE Transactions, volume 66, 1958; pages 318, 319.